United States Patent [19]

Leclerc

[11] 4,086,974
[45] May 2, 1978

[54] CHASSIS FOR VEHICLE

[75] Inventor: Jean-Claude Emile Leclerc, Meaux-Beauval, France

[73] Assignee: Poclain, Le-Plessis-Belleville, France

[21] Appl. No.: 732,434

[22] Filed: Oct. 14, 1976

[30] Foreign Application Priority Data

Oct. 28, 1975 France .................................. 75 32954

[51] Int. Cl.² .................................................. B62D 55/00
[52] U.S. Cl. ......................................... 180/9.5; 305/16
[58] Field of Search ............................. 305/16, 17, 18; 180/9.48, 9.5, 9.52, 9.54, 9.56, 9.58, 9.6

[56] References Cited

U.S. PATENT DOCUMENTS

| | | | |
|---|---|---|---|
| 3,010,530 | 11/1961 | Risk | 180/9.54 |
| 3,225,849 | 12/1965 | Casse | 180/9.5 |
| 3,430,790 | 3/1969 | Beltrami | 180/9.52 |
| 3,576,226 | 4/1971 | Copeland | 180/9.5 |
| 3,926,273 | 12/1975 | Blomstrom | 305/17 |
| 3,974,891 | 8/1976 | Persson | 305/16 |
| 3,980,149 | 9/1976 | Blomstrom | 180/9.5 |
| 3,990,529 | 11/1976 | Bartels | 180/9.48 |
| 4,018,295 | 4/1977 | Hasselbacher | 180/9.5 |

*Primary Examiner*—Joseph F. Peters, Jr.
*Assistant Examiner*—John A. Carroll
*Attorney, Agent, or Firm*—Mason, Fenwick & Lawrence

[57] ABSTRACT

A chassis for a vehicle has two parallel longitudinal side members each connected at two spaced locations to a transverse frame; the transverse frame is connected at two spaced locations to each longitudinal side member by a swivel joint at each respective location with the swivel joints on each side member having coextensive axes located substantially in line with each other and parallel to the longitudinal axes of the side member and by two tie-rods each pivoted at one end on the transverse frame and on an opposite end to the longitudinal side member.

4 Claims, 6 Drawing Figures

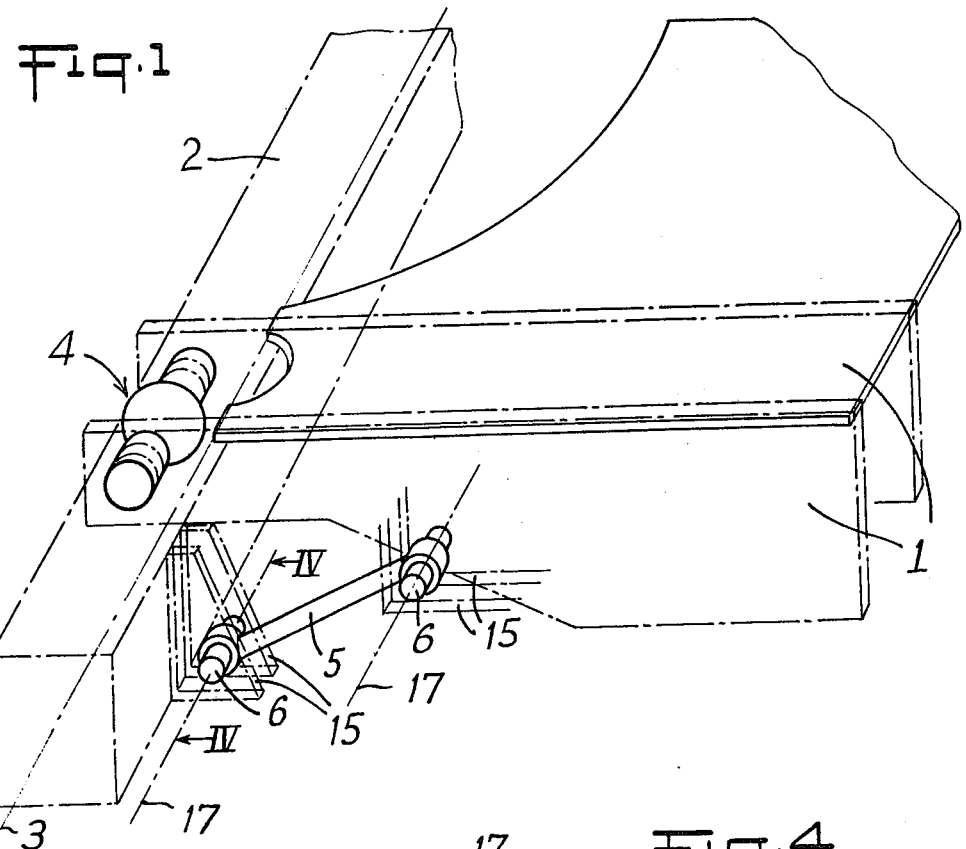
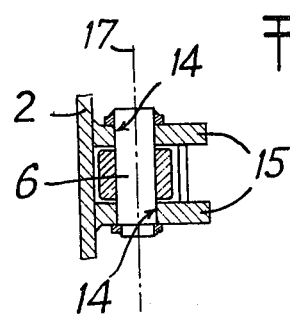
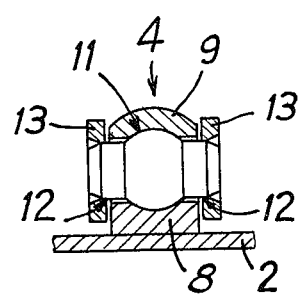
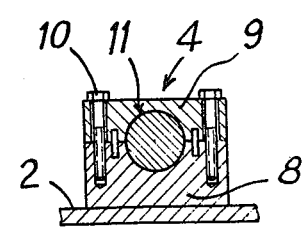

CHASSIS FOR VEHICLE

The present invention relates to an improved chassis for a vehicle.

Public works machines, such as hydraulic shovels, comprise chassis which, up to the present, most widespread technique, are monobloc.

A continuous increase is furthermore observed in the dimensions of said machines and consequently an increase in the dimensions of their chassis. Displacements of the machines between sites are seriously hindered by these increases and there are manufacturing and mechanical resistance problems which are not easily solved.

It is an object of the present invention to remedy the shortcomings in the known technique, by providing such a design as to ensure easy dismantling and increased mechanical resistance of chassis of high performance machines.

To this end, the invention relates to a chassis for a vehicle intended for carrying heavy loads, particularly for a public works machine with a pivoting turret, comprising two parallel longitudinal members to which at least one transverse frame is fixed.

The means for fixing the transverse frame on a longitudinal side member are constituted on the one hand by two swivel joints whose swivel axes, located substantially in line with each other, are parallel to the longitudinal axis of the longitudinal members and on the other hand by two tie-rods pivoted at one end on the frame and an opposite end on one of the longitudinal members.

The joints of the tie-rods on the frame and the longitudinal members are parallel to the longitudinal axis of the longitudinal members.

The invention will be more readily understood on reading the following description given with reference to the accompanying drawings, in which:

FIG. 1 is a partial view, in perspective, of a chassis in accordance with the invention;

FIG. 4 is a section along IV—IV of FIG. 1;

FIG. 5 is a section along V—V of FIG. 2; and

FIG. 6 is a section along VI—VI of FIG. 2.

Figure 2:
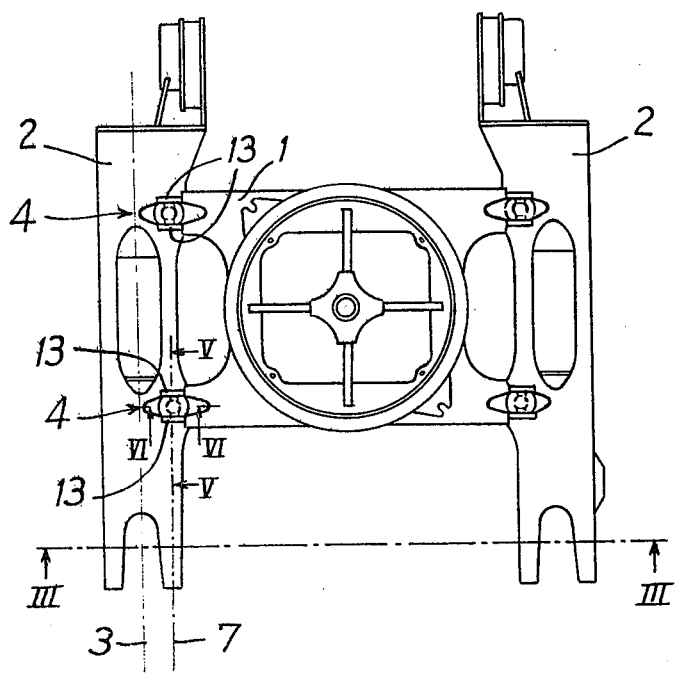
FIG. 2 is a plan view of a chassis according to the invention.
Figure 3:
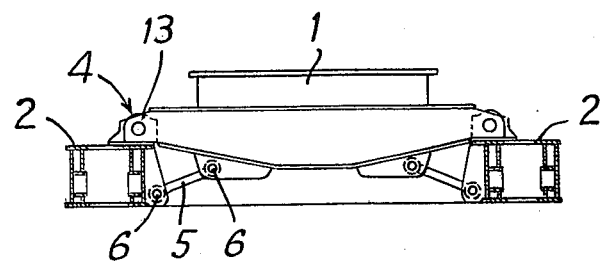
FIG. 3 is a section along III—III of FIG. 2.

Referring now to the drawings, the Figures show the chassis of a hydraulic shovel, constituted by three separate elements assembled together: a central transverse frame 1 and two longitudinal side members 2, which extend parallel in the same direction 3.

The transverse frame 1 is fixed to each longitudinal member 2 on the one hand by two swivel joints 4 and on the other hand by two tie-rods 5 which are coupled by pivot pins 6 to said frame 1 and each longitudinal member 2.

The two spherical swivel joints 4 of the same longitudinal member are aligned in a direction 7 parallel to the direction 3 of said longitudinal member. Each is constituted by a spherical half-bearing 8 welded on the longitudinal member 2, by a bearing cap 9 which is removably fixed to the half-bearing 8 by screws 10, by a spherical swivel joint 11 which is contained in the housing formed by said half-bearing 8 and bearing cap 9, and by two extensions 12 of the swivel joint 11, on which lugs 13 fast with the frame 1 are pivoted.

A pivot pin 6 is mounted in the holes 14 made in two lugs 15 welded on the longitudinal member 2 or on the frame 1. The eye 16 constituting the end of the tie-rod 5 is mounted to rotate on pin 6. The pivot axis 17 is parallel to direction 3.

In this way, the frame 1 is fixed to each longitudinal member 2 by two systems of triangulated connections, each constituted by a swivel joint 4 and two pins 6. The resulting assembly therefore possesses the desired rigidity.

However, the "dismountable" feature of the swivel joints 4 and the pins 6 facilitates both assembly and dismantling, this rendering possible the displacements on the highway of large public works machines, after dismantling.

The swivel joints 4 have the following functions:
connection between longitudinal member 2 and central frame 1 by dismountable bearings,
transmission of the vertical and horizontal stresses (direction parallel to direction 3),
adaptation of the joint to the deformation of the central frame 1 and the longitudinal frame 2.

The tie-rods 5 have the following functions:
undeformable triangulation of the connection between longitudinal member 2 and central frame 1,
transmission of the horizontal stresses (direction perpendicular to the direction 3).

The advantages of such as assembly are as follows:
elimination of the secondary moments produced by the deformations of the longitudinal members and the central frame,
the decomposition of the stresses transmitted.

From the practical point of view, the punching stresses of the longitudinal members 2 in the zone of the swivel joints 4 are observed to be eliminated and therefore considerable mechanical problems are overcome.

One swivel joint 4 out of two is mounted to slide, in order to allow a simple assembly and not to produce any stress by the deformations of the central frame 1.

In addition, two tie-rods 5 out of four are advantageously adjustable, for example by means of a device with eccentric rings contained in the holes for fixing the tie-rod or the frame.

What is claimed is:

1. A chassis for a vehicle intended for supporting heavy loads, comprising two parallel longitudinal side members, a transverse frame extending between said side members, connection means on opposite sides of said transverse frame for connecting said transverse frame to each of said longitudinal side members, said connection means comprising two longitudinally spaced swivel joints provided adjacent each of said longitudinal side members having swivel axes located substantially in longitudinal alignment with each other and parallel to the longitudinal axis of the longitudinal side members and two tie-rods each respectively mounted adjacent one of said swivel joints and pivoted at one end on the transverse frame and on an opposite end to the longitudinal side member.

2. A chassis as defined in claim 1, wherein the pivot axes of the pivotal connections of the tie-rods to the transverse frame and the longitudinal side members are parallel to the longitudinal axis of the longitudinal side members.

3. A chassis as defined in claim 2 wherein said pivot rods are oriented in two transverse vertical planes.

4. A chassis as defined in claim 1 wherein the swivel axes are positioned in a horizontal plane and the pivot axes of the pivotal connections of said tie-rods to said transverse frame are positioned in a horizontal plane intermediate the horizontal planes in which the pivot axes of the pivotal connections of said tie-rods to said longitudinal side members are positioned and the horizontal plane in which the swivel axes of the swivel members are positioned.

* * * * *